United States Patent
Park et al.

(10) Patent No.: US 8,764,070 B2
(45) Date of Patent: Jul. 1, 2014

(54) TUBE-SOCKET ASSEMBLY AND METHOD OF MANUFACTURING THE SAME

(75) Inventors: Sang Hoon Park, Busan (KR); Hyoung Seok Kim, Busan (KR); Jae Hyeok Choi, Gyeongsangnam-do (KR); Sung Ryong Hur, Busan (KR)

(73) Assignee: HS R & A Co., Ltd., Gyeongsangnam-do (KR)

( * ) Notice: Subject to any disclaimer, the term of this patent is extended or adjusted under 35 U.S.C. 154(b) by 578 days.

(21) Appl. No.: 12/975,134

(22) Filed: Dec. 21, 2010

(65) Prior Publication Data

US 2011/0203677 A1    Aug. 25, 2011

(30) Foreign Application Priority Data

Feb. 23, 2010    (KR) .................. 10-2010-0016000

(51) Int. Cl.
*F16L 13/14*    (2006.01)

(52) U.S. Cl.
USPC ................... 285/382.4; 285/382.5

(58) Field of Classification Search
USPC .................. 285/382.4, 382.5, 382
See application file for complete search history.

(56) References Cited

U.S. PATENT DOCUMENTS

| | | | | |
|---|---|---|---|---|
| 2,458,817 A * | 1/1949 | Wolfram | ............... | 285/382.4 |
| 2,469,851 A * | 5/1949 | Stecher et al. | ............... | 285/382.5 |
| 3,817,562 A * | 6/1974 | Cook et al. | ............... | 285/382.5 |
| 3,924,883 A * | 12/1975 | Frank | ............... | 285/382.5 |
| 4,142,843 A * | 3/1979 | Kish | ............... | 285/382.4 |
| 4,147,385 A * | 4/1979 | van der Velden | ............... | 285/382.4 |
| 4,905,766 A * | 3/1990 | Dietz et al. | ............... | 285/382.4 |
| 5,092,634 A * | 3/1992 | Miller | ............... | 285/382.4 |
| 5,297,827 A * | 3/1994 | Choi | ............... | 285/382.4 |
| 6,098,704 A | 8/2000 | Tsuchiya et al. | | |
| 6,206,437 B1 * | 3/2001 | Humphreys | ............... | 285/382.5 |
| 6,328,351 B1 * | 12/2001 | Kato et al. | ............... | 285/382.4 |
| 6,543,817 B1 * | 4/2003 | Turner et al. | ............... | 285/382.5 |
| 2009/0008429 A1 | 1/2009 | Boltshauser | | |
| 2009/0166019 A1 | 7/2009 | Tokizaki et al. | | |

FOREIGN PATENT DOCUMENTS

| | | |
|---|---|---|
| JP | 1988-061682 | 4/1988 |
| JP | 6004221 | 2/1994 |
| JP | 8-210575 | 8/1996 |
| JP | 1998-096598 | 4/1998 |

(Continued)

OTHER PUBLICATIONS

Japanese Notice of Reasons for Rejection (and its English translation), Application No. P2011-019748 (Jul. 20, 2012).

(Continued)

*Primary Examiner* — David E Bochna
(74) *Attorney, Agent, or Firm* — Klarquist Sparkman, LLP

(57) ABSTRACT

A tube-socket assembly and a method of manufacturing the same are provided. The tube-socket assembly includes: a tube in which first and second beads are formed; and a socket fastened to the tube and including a penetration opening portion in which a penetration opening is formed by a predetermined length and a guide portion separated by a predetermined distance from the tube, wherein a first taper portion having an inclined surface is formed at one side of the first bead and forms a beadlock by line-contacting with an inner vertical end portion of the penetration opening portion positioned within the socket. Thereby, by reinforcing seal between the socket and the inner bead of the tube, coupling between the tube and the socket can be more securely performed.

9 Claims, 8 Drawing Sheets

(56) References Cited

FOREIGN PATENT DOCUMENTS

| JP | 2000-120959 | 4/2000 |
|----|-------------|--------|
| JP | 2000146064 | 5/2000 |
| JP | 2002-243380 | 8/2002 |
| JP | 2003-314772 | 11/2003 |
| JP | 2005-344828 | 12/2005 |
| JP | 2007521963 | 8/2007 |
| JP | 2009-162395 | 7/2009 |

OTHER PUBLICATIONS

Korean Office action (and its English translation), Application No. 10-2010-0016000, 8pp. (Feb. 1, 2012).

Korean Office action (and its English translation), Application No. 10-2008-0051974, 8pp. (Oct. 11, 2011).

* cited by examiner

TUBE-SOCKET ASSEMBLY AND METHOD OF MANUFACTURING THE SAME

CROSS REFERENCE TO RELATED APPLICATIONS

This application claims the benefit of Korean application number 10-2010-0016000, filed Feb. 23, 2010which is incorporated by reference herein in its entirety.

BACKGROUND OF THE INVENTION

1. Field of the Invention

The present invention relates to a tube-socket assembly and a method of manufacturing the same, and more particularly, to a tube-socket assembly and a method of manufacturing the same that can provide a secure fastening structure by reinforcing seal between a tube and a socket.

2. Description of the Related Art

A research and development of a tube-socket direct fastening structure, i.e., a tube-socket assembly that directly fastens a tube and a socket has been performed. Particularly, when connecting tubes in which a high pressure fluid flows, secure seal that can minimize leakage of a connection portion thereof is requested.

FIGS. 1 and 2 illustrate conventional tube-socket assemblies. The tube-socket assembly of FIG. 1 has a fastening structure by so-called caulking.

Referring to FIG. 1, after an inner bead 11 is formed, a tube 10 is inserted into a socket 20, and by compressing a portion of the socket 20 using a punch, the portion of the socket 20 caulks the inner bead 11 and seal is thus formed.

In the tube-socket assembly using caulking of FIG. 1, seal is generally formed along an entire outer circumferential surface of the inner bead 11. Accordingly, a portion in which seal is formed is distributed over a wide area, when an area in which seal is formed increases, a fastening force between the socket 20 and the tube 10 is deteriorated, and thus leakage through a fastening portion increases. Even if a pressure applied by a punch for caulking increases, an area of a portion in which seal is formed does not change, and thus deterioration of a fastening force due to pressure increase by a punch cannot be solved.

Further, when a pressure applied by a punch increases, at a position 12 corresponding to a caulking forming portion enclosing the inner bead 11, an inner diameter of the tube may decrease, compared with other portions. That is, as a pressure applied by a punch increases, a phenomenon that materials forming the tube 10 are formed in a lump occurs in a portion in which deformation occurs within the tube 10 and thus a phenomenon that the tube 10 becomes narrow at a position 12 of FIG. 1 occurs.

FIG. 2 illustrates another example of a conventional tube-socket assembly. In the tube-socket assembly of FIG. 2, after inserting a tube 30 in which an outer bead 32 is formed into a socket 40, by applying a pressure to a tube portion positioned within the socket 40 using a punch, an inner bead 31 is formed and seal is formed between the inner bead 31 and the socket 40. A fastening form between the inner bead 31 and the socket 40 is referred to as a beadlock.

In a tube-socket assembly of a beadlock form, in a process of forming the inner bead 31 after positioning the socket 40 at a predetermined position, at an initial stage of forming the inner bead 31, as an outer circumferential surface of the inner bead 31 and a vertical end portion 41 of a penetration opening of the socket 40 line-contact, an area of a portion in which seal is formed may be minimized. However, in a tube-socket assembly of a beadlock form of FIG. 2, in order to form the inner bead 31 of an enough large height, as a pressure applied by a punch increases, a contact area of the outer circumferential surface of the inner bead 31 and the vertical end portion 41 of the penetration opening of the socket 40 increases, and thus seal may decrease.

FIGS. 3A to 3C illustrate a process of forming the conventional beadlock form tube-socket assembly of FIG. 2.

Referring to FIGS. 3A to 3C, a conventional beadlock form tube-socket assembly forming process starts from a process of forming the outer bead 32 in the tube 30. Thereafter, at a position where the outer bead 32 contacts with an outer end portion of the socket 40, the socket 40 is positioned. After disposing the socket 40 on the tube 30, by compressing a portion of the tube 30 toward the socket 40 using a punch, the inner bead 31 is formed. In this way, after forming the outer bead 32 and installing the socket 40, as the inner bead 31 is formed, in a compression process using a punch, the socket 40 may be pushed toward the outer bead 32. Accordingly, seal between the inner bead 31 and the socket 40 may be deteriorated.

As in the structure of FIG. 1, in the beadlock form tube-socket assembly of FIG. 2, in a process of forming the inner bead 31, as a compressing force is applied, a phenomenon that materials forming a tube are formed in a lump about a portion in which deformation occurs within the tube 30 occurs, and thus a phenomenon that the tube 30 become narrow occurs at a position 33 of FIG. 2.

Further, in a state where the outer bead 32 is formed, when an excessive pressure for forming the inner bead 31 is applied to the tube 30, a coating layer formed in a surface of the outer bead 32 may be peeled off, and in this way, when coating of a portion of the outer bead 32 exposed from the outside of the socket 40 is damaged, corrosion resistance of the tube 30 may be deteriorated.

SUMMARY OF THE INVENTION

The present invention has been made in view of the above problems, and provides a tube-socket assembly and a method of manufacturing the same that can maximize a coupling force of a tube and a socket and that can minimize leakage through a connection portion of a tube and a socket, by enabling an inner bead to form seal in a state where the inner bead line-contacts with the socket after first forming the inner bead having a taper portion at one side and forming a step portion having space that can house the inner bead within the socket.

In accordance with an aspect of the present invention, a tube-socket assembly includes: a tube in which first and second beads are formed; and a socket fastened to the tube and including a penetration opening portion in which a penetration opening is formed in a predetermined length and a guide portion separated by a predetermined distance from the tube, wherein a first taper portion having an inclined surface is formed at one side of the first bead and forms a beadlock by line-contacting with an inner vertical end portion of the penetration opening portion positioned within the socket.

Preferably, the socket further includes a step portion that forms a step from the inner vertical end portion of the penetration opening portion town inner wall surface of the guide portion.

Preferably, the step portion includes a first vertical plane formed in a vertical direction from the inner vertical end portion of the penetration opening portion, a horizontal plane formed in a length direction of the tube while being formed perpendicular to the first vertical plane, and a second vertical plane formed in the inner wall surface of the guide portion in a vertical direction from the horizontal plane.

Preferably, at the other side of the first bead, a vertical portion is formed in a vertical direction from an outer circumferential edge of the tube, and the vertical portion forms one plane with the second vertical plane.

Preferably, a top portion of a vertical portion of the first bead contacts with a horizontal plane of the socket.

Preferably, the penetration opening portion of the socket has a gradually increasing diameter from a predetermined position to an inner vertical end portion of the penetration opening portion.

Preferably, the penetration opening portion of the socket includes an additional step portion formed in a direction receding from the first bead from the inner vertical end portion.

Preferably, the second bead contacts with an outer vertical end portion of the penetration opening portion of the socket at the outside of the socket.

Preferably, at one side of the second bead, a second taper portion having an inclined surface is formed.

Preferably, the socket has a step formed between the outer vertical end portion of the penetration opening portion and an outer circumferential edge of the guide portion.

In accordance with another aspect of the present invention, a method of forming a tube-socket assembly, the method includes: forming a first bead in a tube and forming a first taper portion having an inclined surface at one side of the first bead; positioning a socket having a penetration opening portion in which a penetration opening having a diameter corresponding to an outer diameter of the tube is formed in a predetermined length and a guide portion separated by a predetermined distance from the tube in order to form space for inserting another tube at the tube and positioning the socket so that an inner vertical end portion of the penetration opening portion positioned within the socket line-contacts with the first taper portion; and forming a second bead of the tube in an outer portion of the socket and forming a beadlock between the first taper portion and the inner vertical end portion of the penetration opening portion by applying a pressure at the other side opposite to one side in which the first taper portion is formed.

Preferably, the socket includes a step portion including a first vertical plane formed in a vertical direction from the inner vertical end portion of the penetration opening portion, a horizontal plane formed in a length direction of the tube while being formed perpendicular to the first vertical plane, and a second vertical plane formed to the inner wall surface of the guide portion in a vertical direction from the horizontal plane.

Preferably, forming a second bead of the tube in an outer portion of the socket and forming a beadlock between the first taper portion and the inner vertical end portion of the penetration opening portion includes forming a vertical portion perpendicular to the outer circumferential edge of the tube at the other side of the first bead.

Preferably, when forming the second bead of the tube in an outer portion of the socket and forming a beadlock between the first taper portion and the inner vertical end portion of the penetration opening portion, the formed vertical portion forms one plane with a second vertical surface of the socket.

Preferably, the second bead and the vertical portion are simultaneously formed.

Preferably, when forming a second bead of the tube in an outer portion of the socket and forming a beadlock between the first taper portion and the inner vertical end portion of the penetration opening portion, the second bead has a second taper portion having an inclined surface at one side thereof.

Preferably, the second taper portion is formed by a taper portion formed in a vise for fixing a state where the socket is positioned at the tube.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Figure 1:
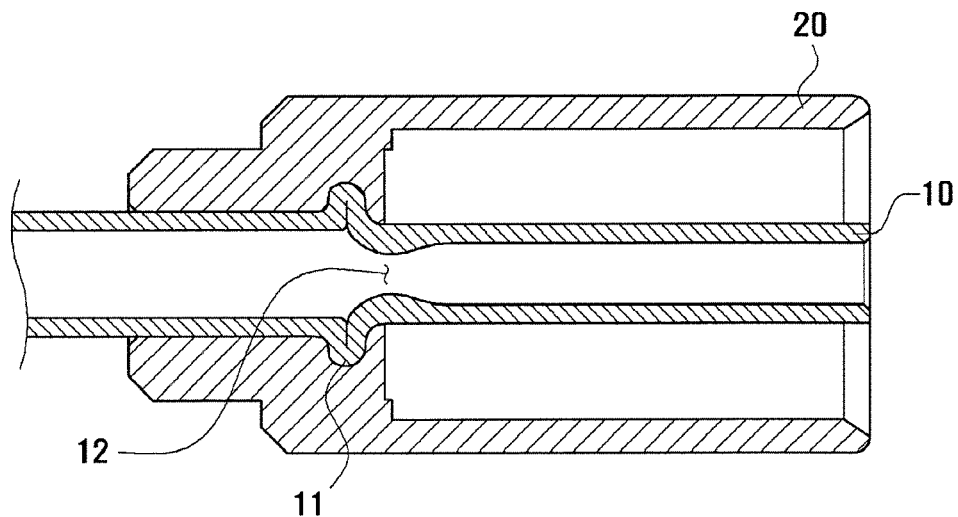
FIG. 1 is a cross-sectional view illustrating an example of a conventional tube-socket assembly.
Figure 2:
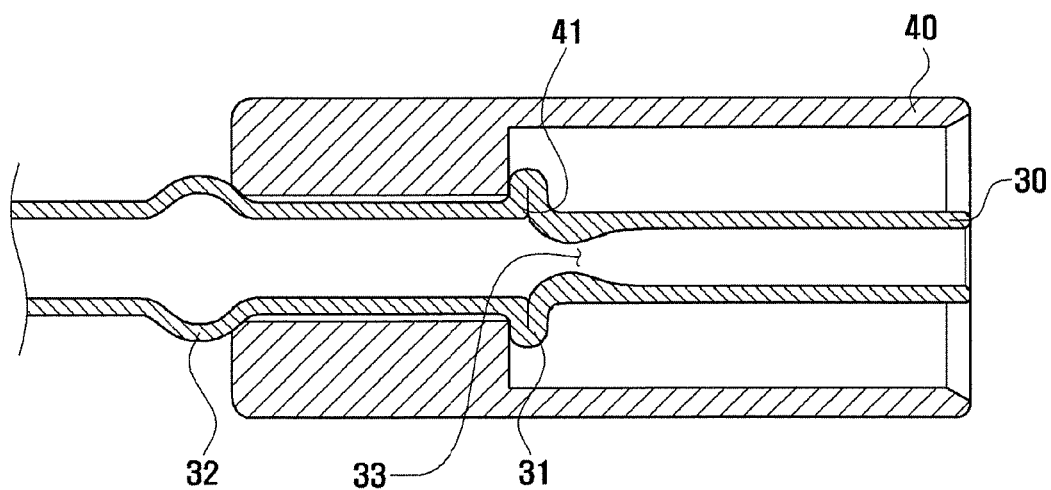
FIG. 2 is a cross-sectional view illustrating another example of a conventional tube-socket assembly.
Figure 3A:
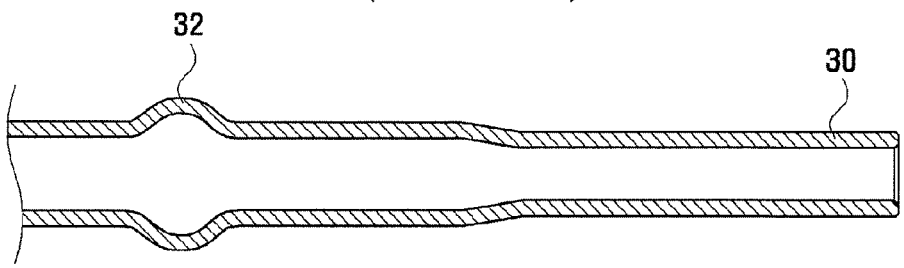
FIGS. 3A to 3C are cross-sectional views illustrating a process of manufacturing the conventional tube-socket assembly of FIG. 2.
Figure 3B:
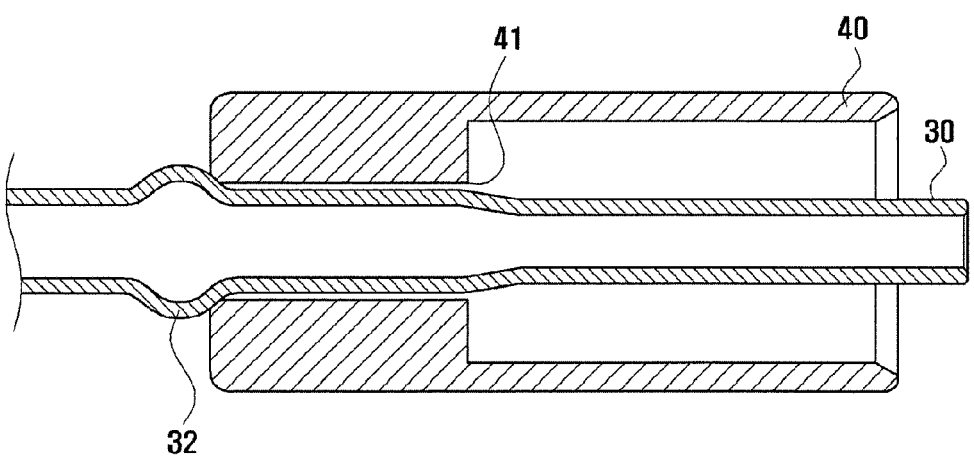
Figure 3C:
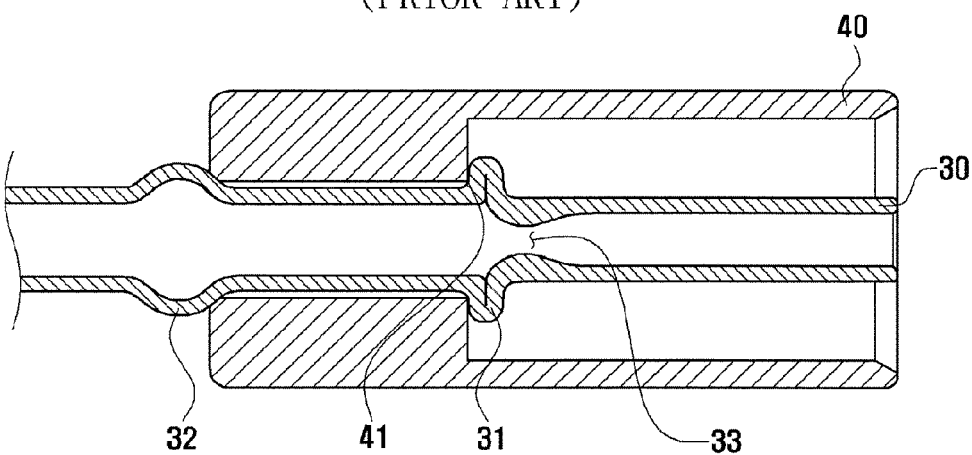

Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present invention.

Figure 4:
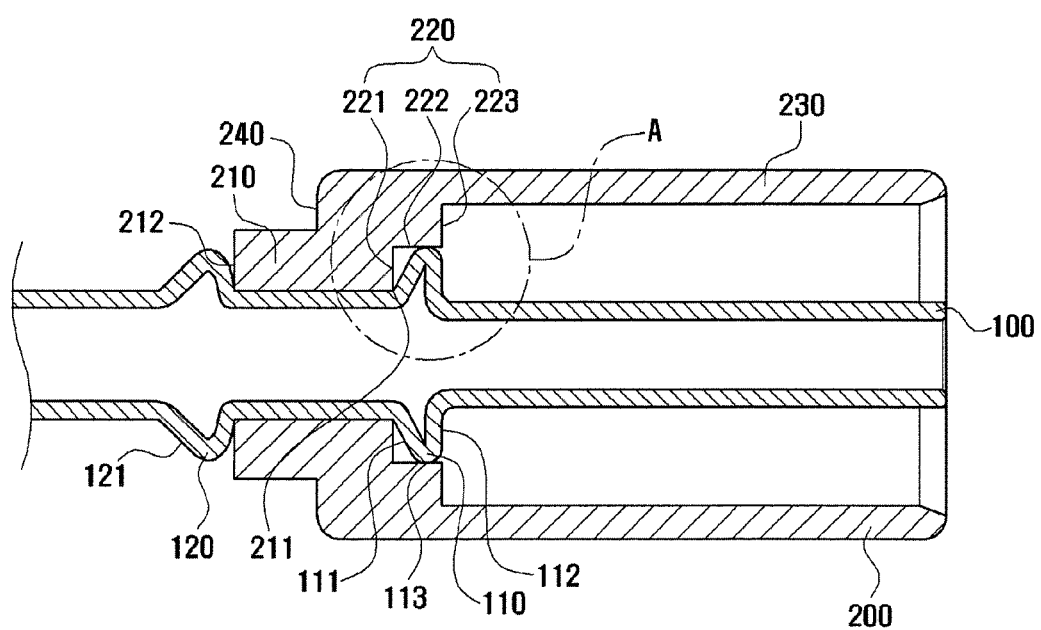
FIG. 4 is a cross-sectional view illustrating a tube-socket assembly according to an exemplary embodiment of the present invention.

FIG. 4 is a cross-sectional view illustrating a tube-socket assembly according to an exemplary embodiment of the present invention.

Referring to FIG. 4, the tube-socket assembly according to the present exemplary embodiment includes a tube 100 in which first and second beads 110 and 120 are formed and a socket 200 fastened to the tube 100.

The first bead 110 formed in the tube 100 is an inner bead positioned within the socket 200, and the second bead 120 is an outer bead positioned outside the socket 200. A first taper portion 111 having an inclined surface is formed at one side of the first bead 110. An inclination angle of the first taper portion 111 is not particularly limited. A vertical portion 112 perpendicular to an outer circumferential surface of the tube 100 is formed at the other side opposite to one side in which the first taper portion 111 is formed. The second bead 120 has a second taper portion 121 having an inclination surface at one side thereof. An inclination angle of the second taper portion 121 is not particularly limited. In the present exemplary embodiment of FIG. 4, the second taper portion 121 is formed at one side of the second bead 120, however a position of the second taper portion 121 is not limited thereto. In a configuration of the tube-socket assembly according to the present exemplary embodiment, it is necessary that a taper portion is formed in the first bead 110, which is an inner bead.

A coating layer is formed in the tube 100, and particularly, a coating layer is formed in portions extended in a direction in which the second bead 120 is formed from the first bead 110. Before forming the first bead 110, coating of a portion of the tube 100 positioned within the socket 200 may be removed.

The socket 200 is fastened around the outer circumferential edge of the tube 100. In order to insert the tube 100 into the socket 200, the socket 200 includes a penetration opening portion 210 having a penetration opening of a diameter corresponding to an outer diameter of the tube 100, a guide portion 230 formed at a predetermined distance from the outer circumferential edge of the tube 100, and a step portion 220 for connecting the penetration opening portion 210 and the guide portion 230.

Because the tube 100 should be inserted into the socket 200 through a penetration opening, a diameter of a penetration opening formed in the penetration opening portion 210 is generally a little greater than an outer diameter of the tube 100. The penetration opening portion 210 includes an outer vertical end portion 212 that becomes an end portion of the socket 200 and an inner vertical end portion 211 positioned within the socket 200, and the inner vertical end portion 211 line-contacts with an inclined surface of the first taper portion 111 of the first bead 110.

The step portion 220 formed within the socket 200 includes a first vertical plane 221 formed in a vertical direction from the inner vertical end portion 211 of the penetration opening portion 210, a horizontal plane 222 formed in a length direction of the tube 100 while being formed perpendicular to the first vertical plane 221, and a second vertical plane 223 formed to an inner wall surface of the guide portion 230 in a vertical direction from the horizontal plane 222. In the first vertical plane 221, when the first taper portion 111 of the first bead 110 is compressed to the inner vertical end portion 211 of the penetration opening portion 210, it is preferable that a top portion 113 of the first bead 110 has a height that contacts with the horizontal plane 222, however it is not limited thereto. In the horizontal plane 222, when the first taper portion 111 of the first bead 110 is compressed to the inner vertical end portion 211 of the penetration opening portion 210, the second vertical plane 223 and the vertical portion 112 of the first bead 110 are formed in a length that forms one plane.

The guide portion 230 of the socket 200 is separated by a predetermined distance from the outer circumferential edge of the tube 100, and thus predetermined space is formed between the tube 100 and the guide portion 230 of the socket within the socket 200. Another tube (not shown) is inserted into the space.

The socket 200 has a step along the outer circumferential edge. That is, a step 240 is formed between the outer vertical end portion 212 of the penetration opening portion 210 and the outer circumferential edge of the guide portion 230. The step 240 provides space for covering a guide mold of a mold for compressing a tube-socket assembly to be described later. The other side of the second bead 120, i.e. and the other side opposite to one side in which the second taper portion 121 of the second bead 120 is formed contacts with the outer vertical end portion 212 of the penetration opening portion 210 upon compressing by a punch.

Figure 5A:
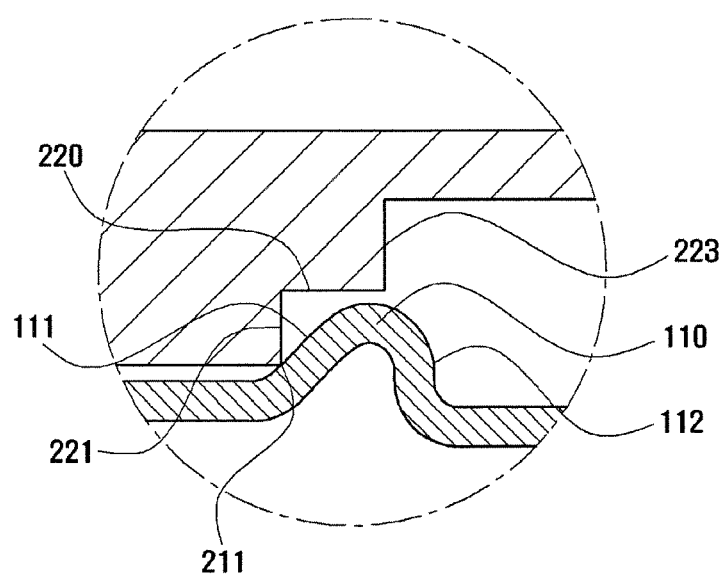
FIGS. 5A and 5B are enlarged views of a portion A of FIG. 4.
Figure 5B:
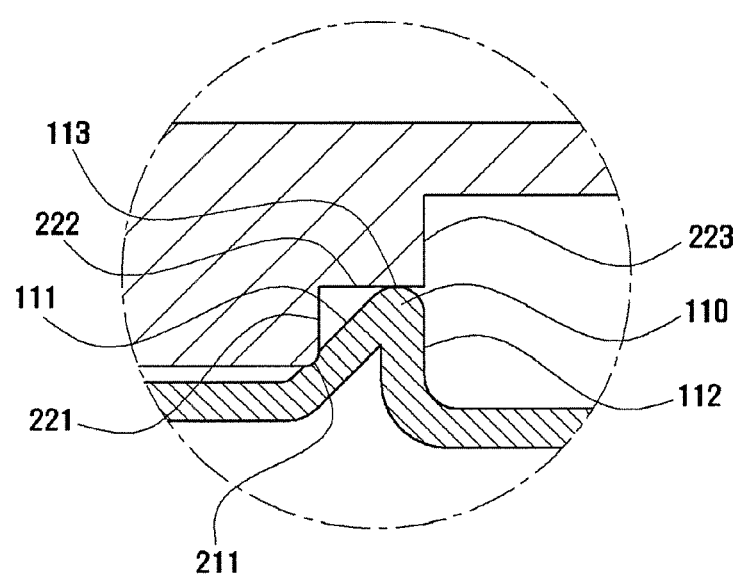

FIG. 5A is an enlarged view of a portion A of FIG. 4, and FIG. 5B is an enlarged view of a portion A in a state before being compressed to a state of FIG. 5A.

Referring to FIG. 5A, in a tube-socket assembly according to the present exemplary embodiment, even if the first bead 110 is compressed to the inner vertical end portion 211 of the penetration opening portion 210 due to pressing by a punch, a first line contact state is sustained to the maximum. This is because compression occurs in a state where an inclined surface of the first taper portion 111 accurately line-contacts with the inner vertical end portion 211 of the penetration opening portion 210, and thus a point where a pressure applied in a length direction of the tube 100 operates on the first taper portion 111 can be stably sustained.

Referring to FIG. 5B, before a beadlock is finally formed, the horizontal plane 222 of the socket 200 and the top portion 113 of the first bead 110 may not contact, and when a beadlock is finally formed, the top portion 113 of the first bead 110 contacts with the horizontal plane 222 of the socket 200.

Figure 6:
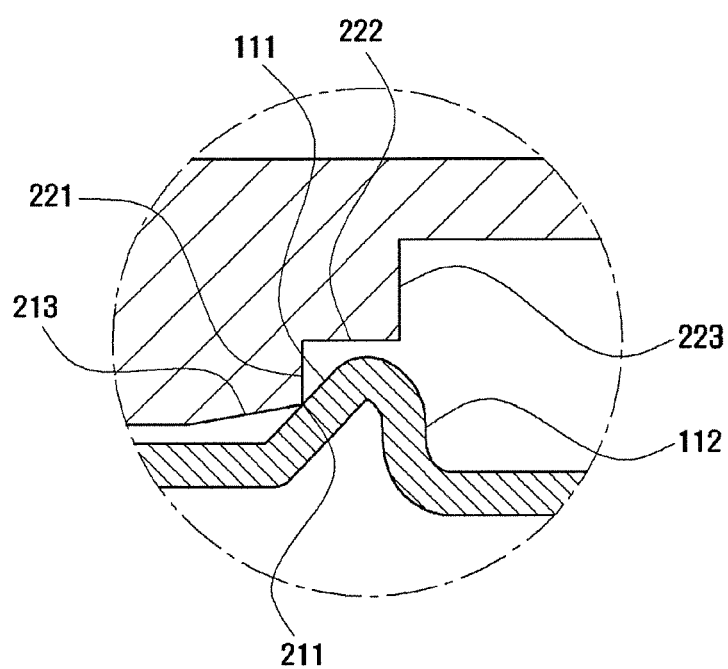
FIGS. 6 and 7 are partially enlarged views of a tube-socket assembly according to modified examples of the present invention.

FIG. 6 is a partially enlarged view illustrating a first modified example of a tube-socket assembly according to an exemplary embodiment of the present invention.

FIG. 6 illustrates a modified example in which only a portion corresponding to a portion A of FIG. 4 is different from the portion of FIG. 5A.

Referring to FIG. 6, in a first modified example of a tube-socket assembly according to the present embodiment, the penetration opening portion 210 does not have the same diameter over all segments but has a gradually increasing diameter at a segment from a predetermined position to the inner vertical end portion 211 of the penetration opening portion 210. In the tube-socket assembly of FIGS. 4 and 5A, the penetration opening portion 210 has the same diameter over an entire segment.

Figure 7:
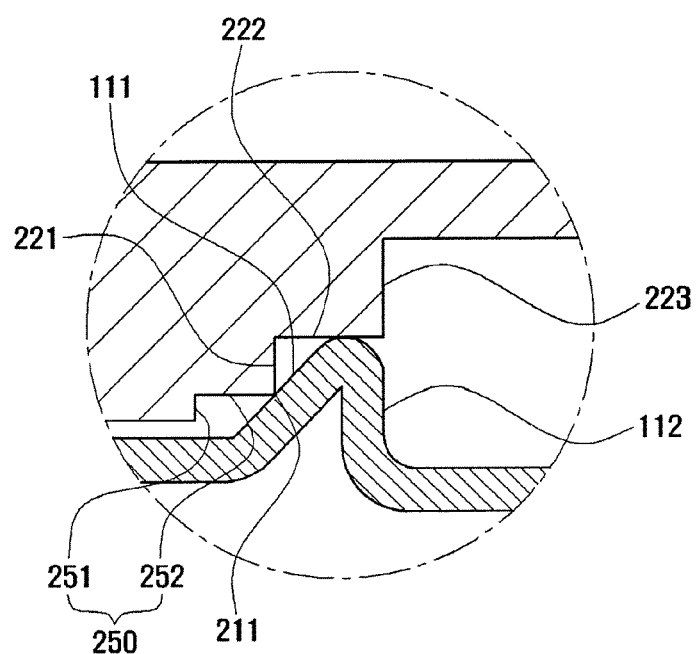

FIG. 7 is a partially enlarged view illustrating a second modified example of a tube-socket assembly according to an exemplary embodiment of the present invention.

Unlike the first modified example of FIG. 6, the second modified example of FIG. 7 includes an additional step portion 250 including an additional horizontal plane 252 formed at a predetermined distance from the inner vertical end portion 211 of the penetration opening portion 210 and an additional vertical plane 251 formed perpendicular from an end portion of the additional horizontal plane 252. In this way, as the additional step portion 250 is formed in a direction receding from the first bead 110 from the inner vertical end portion 211, the second modified example of FIG. 7 has a relatively small sealing area, compared with the first modified example of FIG. 6.

FIGS. 8A to 8D are cross-sectional views illustrating each process of a method of manufacturing a tube-socket assembly according to an exemplary embodiment of the present invention.

Figure 8A:
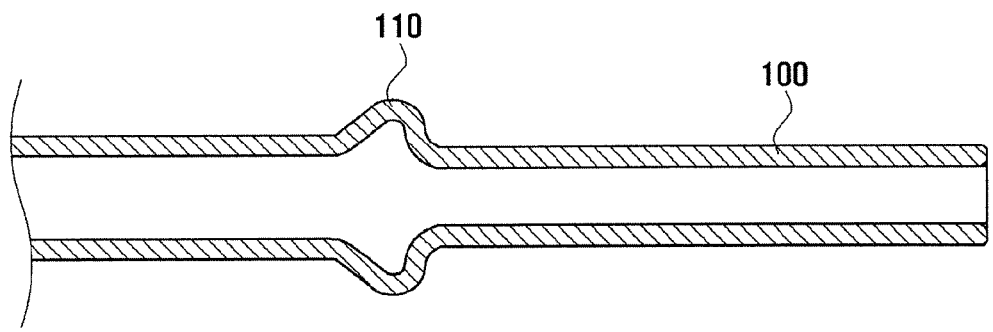
FIGS. 8A to 8D are cross-sectional views illustrating a process of manufacturing the tube-socket assembly of FIG. 4.

Referring to FIG. 8A, a first bead 110 is formed in a tube 100. Although not shown, before the first bead 110 is formed, a process of cutting a tube in a required length, a buffing process of removing some of a coating layer formed in the tube, and a contracting process and a rolling process of a rear end portion of the first bead 110 are first performed. Such a buffing process, contracting process, and rolling process are well known to a person of ordinary skill in the art and therefore a detailed description thereof is omitted.

Figure 8B:
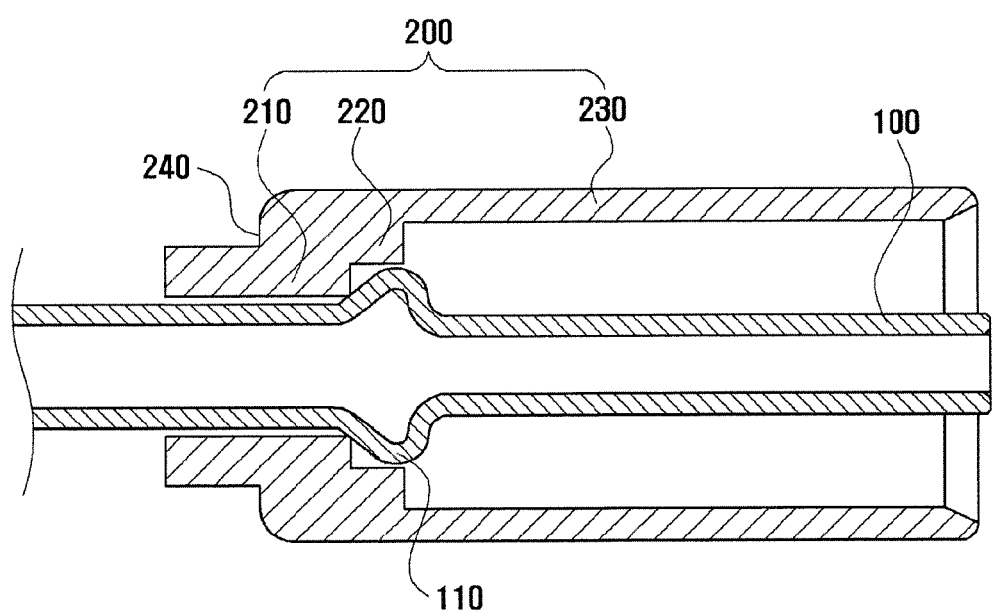

In this way, after the first bead 110 is formed, a socket 200 is positioned at an appropriate position, as shown in FIG. 8B. The socket 200 is installed at a position at which an inner vertical end portion 211 of a penetration opening portion 210 line-contacts with a taper portion 111 of the first bead 110. After the socket 200 is positioned at an accurate position, the tube-socket assembly is fixed to a mold for compressing the tube-socket assembly.

Figure 8C:
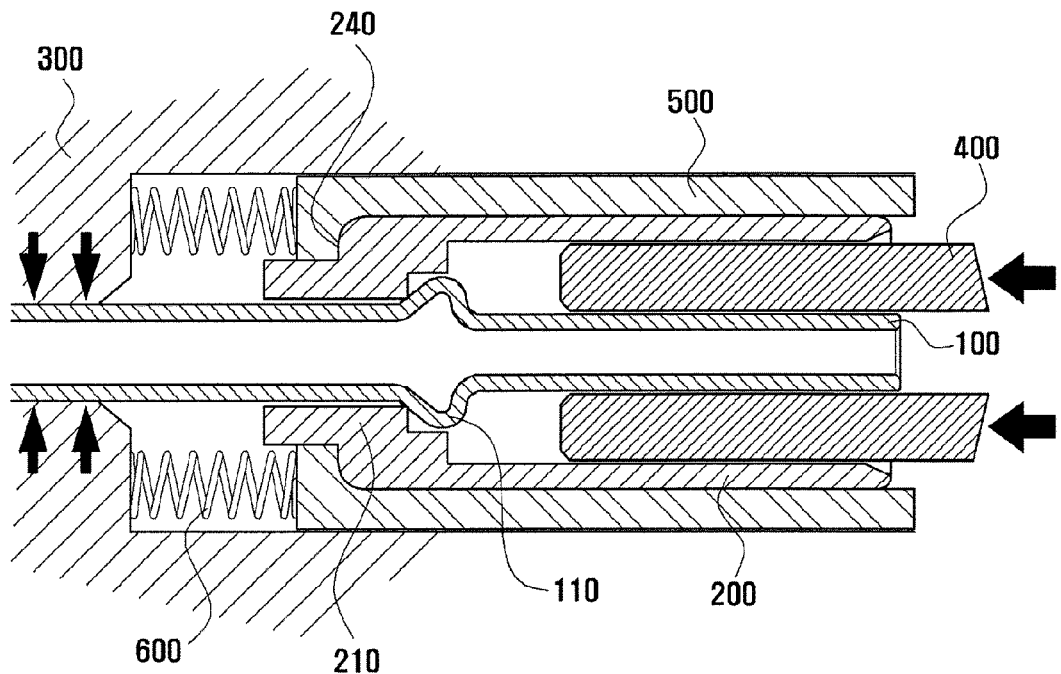

Referring to FIG. 8C, a mold for using in compressing the tube-socket assembly includes a vise 300 for fixing the tube-socket assembly, a punch 400 for applying a pressing force, a guide mold 500 for guiding a compression process, and an elastic member 600 for applying an elastic force between the guide mold 500 and the vise 300. The vise 300 is a device for fixing the tube-socket assembly, and the punch 400 is a device for applying a pressing force for forming a second bead 120 while compressing a vertical portion 112 of the first bead 110 in order to form one plane with a second vertical plane 223 of the socket 200.

Figure 8D:
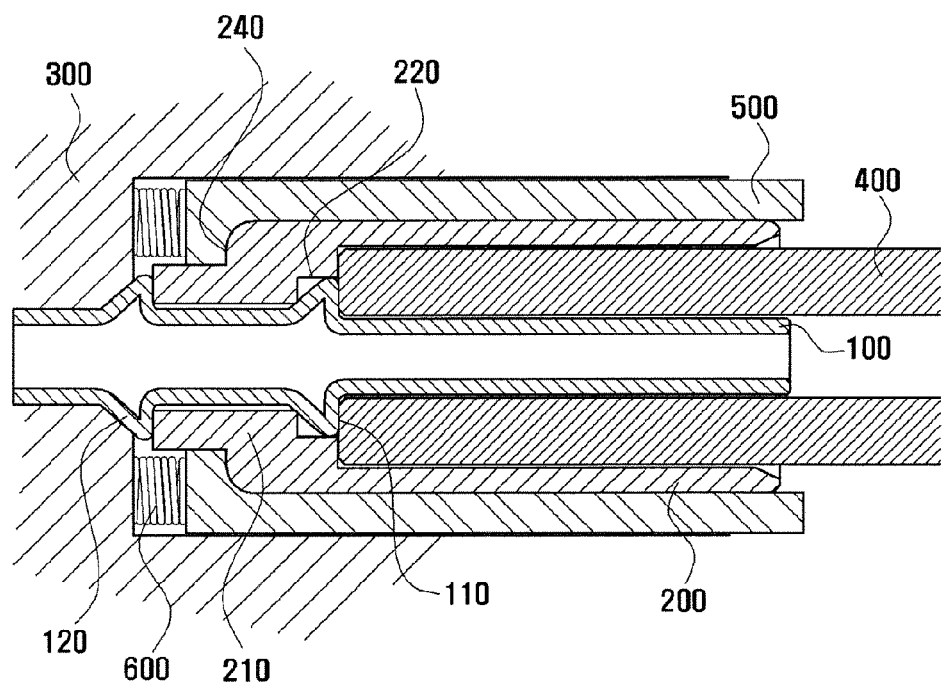

Referring to FIGS. 8C and 8D, the vise 300 has a taper portion, and the second taper portion 121 is formed at one side of the second bead 120 by the taper portion. The guide mold 500 is a device for guiding the socket 200 in a compression process by the punch 400 and has a front end portion that engages with a step 240 of the socket 200. In this way, the guide mold 500 is covered by the step 240 of the socket 200, and therefore in the method of manufacturing a tube-socket assembly according to the present exemplary embodiment, restriction due to interference between molds does not occur. The elastic member 600 is installed between one end portion of the vise 300 and a front end portion of the guide mold 500 and provides a predetermined elastic force in a compression process using a punch.

In the method of manufacturing a tube-socket assembly according to the present exemplary embodiment, the second bead 120 is formed in a process of forming a beadlock by compressing the first bead 110. Therefore, as in the prior art, after an outer bead is first formed, as an inner bead is formed, a phenomenon that a coating layer formed in the outer bead is damaged can be prevented. Further, by forming the second taper portion 121 at one side of the second bead 120 through a tapered portion formed in the vise 300, even if a compressing force by the punch 400 increases, a coating layer formed in the second bead 120 can be prevented from being damaged.

As described above, in a tube-socket assembly and a method of manufacturing the same according to an exemplary embodiment of the present invention, by performing compression while sustaining a first contact state of an inner bead and a socket to the maximum, it can be prevented that an area of a portion in which seal is formed is excessively widened in a compression process, and a coupling force between the tube and the socket can be reinforced.

Further, even if a pressure applied to the inner bead increases, a phenomenon that materials are formed in a lump toward a tube center can be prevented and thus a phenomenon that a tube becomes narrow can be prevented and coating of a portion in which an outer bead is formed can be prevented from being damaged.

Further, restriction due to interference between molds used for compressing the tube-socket assembly can be reduced, and by applying a stronger pressure, a beadlock can be formed.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A tube-socket assembly comprising:
   a tube in which first and second beads are formed; and
   a socket fastened to the tube and comprising a penetration opening portion in which a penetration opening formed at one end of the socket extends over a predetermined length and a guide portion separated by a predetermined distance from the tube,
   wherein a first taper portion having an inclined surface is formed at one side of the first bead and forms a beadlock by line-contacting with an inner vertical end portion of the penetration opening portion positioned within the socket,
   wherein the second bead contacts with an outer vertical end portion of the penetration opening portion of the socket at the outside of the socket.

2. The tube-socket assembly of claim 1, wherein the socket further comprises a step portion that forms a step from the inner vertical end portion of the penetration opening portion to an inner wall surface of the guide portion.

3. The tube-socket assembly of claim 1, wherein the penetration opening portion of the socket has a gradually increasing diameter from a predetermined position to an inner vertical end portion of the penetration opening portion.

4. The tube-socket assembly of claim 1, wherein the penetration opening portion of the socket comprises an additional step portion formed in a direction receding from the first bead from the inner vertical end portion.

5. The tube-socket assembly of claim 1, wherein at one side of the second bead, a second taper portion having an inclined surface is formed.

6. The tube-socket assembly of claim 1, wherein the socket has a step formed between the outer vertical end portion of the penetration opening portion and an outer circumferential edge of the guide portion.

7. A tube-socket assembly comprising:
   a tube in which first and second beads are formed; and
   a socket fastened to the tube and comprising a penetration opening portion in which a penetration opening is formed in a predetermined length and a guide portion separated by a predetermined distance from the tube,
   wherein a first taper portion having an inclined surface is formed at one side of the first bead and forms a beadlock by line-contacting with an inner vertical end portion of the penetration opening portion positioned within the socket,
   wherein the socket further comprises a step portion that forms a step from the inner vertical end portion of the penetration opening portion to an inner wall surface of the guide portion,
   wherein the step portion comprises a first vertical plane formed in a vertical direction from the inner vertical end portion of the penetration opening portion, a horizontal plane formed in a length direction of the tube while being formed perpendicular to the first vertical plane, and a second vertical plane formed in the inner wall surface of the guide portion in a vertical direction from the horizontal plane.

8. The tube-socket assembly of claim 7, wherein at the other side of the first bead, a vertical portion is formed in a vertical direction from an outer circumferential edge of the tube, and the vertical portion forms one plane with the second vertical plane.

9. The tube-socket assembly of claim 8, wherein a top portion of a vertical portion of the first bead contacts with a horizontal plane of the socket.

* * * * *